United States Patent [19]

Brocklehurst et al.

[11] Patent Number: 4,643,840

[45] Date of Patent: Feb. 17, 1987

[54] PAINT STRIPPER COMPOSITIONS

[75] Inventors: Peter Brocklehurst, Chappletown, Nr. Sheffield; Angus S. Ferguson, Sheffield, both of England

[73] Assignee: Sterling Drug Inc., New York, N.Y.

[21] Appl. No.: 343,156

[22] Filed: Jan. 27, 1982

Related U.S. Application Data

[63] Continuation-in-part of Ser. No. 212,079, Dec. 1, 1980, abandoned.

[30] Foreign Application Priority Data

Feb. 12, 1981 [GB] United Kingdom ............... 8104467

[51] Int. Cl.$^4$ .................. C11D 3/14; C11D 7/06; B08B 7/00
[52] U.S. Cl. ........................................ 252/160; 134/4; 134/38; 252/156; 252/174.17; 252/174.24; 252/174.25; 252/DIG. 8
[58] Field of Search ............... 252/140, 156, 158, 159, 252/160, DIG. 8, 155; 134/4, 38, 42

[56] References Cited

U.S. PATENT DOCUMENTS

| | | | |
|---|---|---|---|
| 1,181,361 | 5/1916 | Wessel | 252/125 |
| 1,565,536 | 12/1925 | Wandel | 134/4 |
| 1,647,399 | 11/1927 | Ellis | 252/160 |
| 1,657,147 | 12/1925 | Brainard | 252/134 |
| 1,714,530 | 5/1929 | Trenain et al. | 252/140 |
| 2,029,992 | 2/1936 | Ellis | 134/7 |
| 2,447,052 | 8/1948 | Bond et al. | 252/159 |
| 3,079,284 | 2/1963 | Boucher et al. | 134/4 |
| 3,615,825 | 10/1971 | Gansser | 134/38 |
| 3,865,684 | 2/1975 | Gleason et al. | 162/8 |
| 4,200,671 | 4/1980 | Krajewski et al. | 427/154 |
| 4,325,744 | 4/1982 | Panayappan et al. | 134/4 |
| 4,368,082 | 1/1983 | Poels | 134/4 |

FOREIGN PATENT DOCUMENTS 166282 8/1954 Australia .
199504 6/1923 United Kingdom .

Primary Examiner—Prince E. Willis
Attorney, Agent, or Firm—William G. Webb; B. Woodrow Wyatt; Paul E. Dupont

[57] ABSTRACT

Alkaline paint stripper compositions contain either a fibrous material or a combination of a xanthan gum and hectorite clay so as to provide a peelable skin over a painted surface.

24 Claims, No Drawings

PAINT STRIPPER COMPOSITIONS

RELATED APPLICATIONS

This is a continuation-in-part of our prior, copending application Ser. No. 212,079, filed Dec. 1, 1980, now abandoned.

FIELD OF THE INVENTION

This invention relates to paint strippers, and in particular to paint stripping compositions containing an alkaline material.

DESCRIPTION OF THE PRIOR ART

Tremain et al. U.S. Pat. No. 1,714,530 describes an alkaline paint and varnish remover which is constituted in a solid form containing, inter alia, starch as a thickening agent. The starch is stated to serve the purpose of holding the composition together and to cause it to adhere to a surface to which it is applied. The solid compositions are prepared for use by mixing with water. The aqueous mixture is then applied to a painted or varnished surface, and when the paint or varnish is sufficiently soft, the surface is then flushed off with water.

Bond et al. U.S. Pat. No. 2,447,052 describes an alkaline paint remover intended for use in stripping paint from vertical steel surfaces. The alkaline compositions contain a gelling agent, such as bentonite or "hydrous oxide gels of iron and cerium and organic gelling agents such as starch, proteins and various gums", which give the compositions sufficient consistency to enable them to adhere to vertical surfaces. In use the compositions are spread on the painted surface by brushing or spraying, and after the paint has softened, the surface is washed off with water.

Gansser U.S. Pat. No. 3,615,825 describes alkaline paint stripping compositions containing alkali and an alkoxy-alkylamine in an aqueous medium. Optionally the compositions may contain a thickening agent such as starches, flours, methyl cellulose or glue.

Brainard U.S. Pat. No. 1,657,147 discloses non-caustic varnish and paint remover compositions containing carbonate, i.e. sodium carbonate, and sodium silicate as a gelling and thickening agent.

Ellis U.S. Pat. No. 2,029,992 discloses a liquid finish remover consisting of a solution of paraffin wax in benzene and acetone. In use the solution is spread over the painted surface to be cleaned, and sawdust is sprinkled over the surface in order to form an absorbent mass which is more readily removed than the liquid slush alone.

SUMMARY OF THE INVENTION

This invention relates to paint stripping compositions which are so constituted that they form a film or peelable skin over a painted surface which facilitates removal of paint from the surface. The compositions are thus particularly valuable in removing paint from vertical or uneven surfaces or from surfaces having complex shapes such as furniture.

DETAILED DESCRIPTION OF THE PREFERRED EMBODIMENTS

When redecorating it is frequently desirable to remove old layers of paint, either to provide a good basis for new paint or to expose the underlying surface. Traditionally, a blow-torch has been employed to soften the old paint which is removed with a scraper. However, this requires considerable skill, and even experienced decorators can scorch the underlying surface. This may not be a serious drawback when the surface is to be repainted, but where, for example, a cleaned wooden surface is to be left unpainted, scorch marks are unsightly.

The amateur decorator therefore generally avoids using a blow-torch, and instead relies on chemical paint strippers. In general, such paint strippers are applied to the painted surface, left for a time in order to allow the paint to become soft, and then paint and stripper are removed together with a scraper. Paint strippers fall into two broad categories: organic solvent-based strippers and aqueous, alkaline strippers.

Organic solvents are used as the basis for the first category of conventional strippers, often in conjunction with an alkali. These are very effective but extremely unpleasant to use because of the presence of the solvent, and the "thin" nature of the composition which leads to drips and runs.

In place of the organic vehicle, water has been used to form aqueous compositions which usually contain an alkali as the active paint-stripping ingredient. Again the "thin" nature of such compositions makes them inconvenient to use, and also the tendency of the composition to evaporate and to run off vertical surfaces means that the active ingredient is not in contact with the paint long enough to result in efficient stripping.

A recent improvement in aqueous strippers has been obtained by including a gellant and a filler such as chalk in the composition to give a pasty consistency. This makes application of the stripper to a painted surface much easier and removes the problem of dripping, while removal of the stripper and softened paint from flat surfaces is greatly facilitated since it can be virtually lifted off the surface using a paint scraper. The combined stripper/paint layer has no lateral cohesion, however, so that it is necessary to remove it by passing the scraper over the entire area between the layer and the underlying surface. On flat areas this causes no difficulty but over complex curvatures, such as on chair legs or cornices, the removal is not readily accomplished with a scraper.

It has now been found that remarkably good paint stripping may be achieved, particularly on surfaces bearing oil-based paint, with a stripper which forms a peelable skin over the painted surface. The alkali is held in contact with the paint to be stripped which is thus efficiently softened, and the subsequent removal of the stripper/paint layer is greatly facilitated, particularly on complex shapes.

Accordingly, in one aspect this invention provides a spreadable aqueous paint stripper composition which comprises an alkali in an amount such that the composition is capable of stripping paint, together with one or more skin forming promoter components whereby, when the composition is applied as a layer over a painted surface to be stripped, it forms over the surface a peelable skin, the skin having a tear strength sufficient for it to be separated and removed from the underlying surface and an adhesive strength sufficient to separate and remove from the underlying surface paint softened by contact with the composition.

The composition of the invention is applied as a layer over a painted surface to be stripped, and forms a peelable skin thereover. The peelable skin has a tear strength sufficient for it to be separated from the underlying surface as an integral gel. Thus, the layer of composition develops a lateral strength which permits its removal as an intact skin. However, the lateral strength need not be high for the advantages to be achieved, and the skin need not, for example, possess lateral elastic properties.

The means for providing the peelable property in the skin formed using the compositions and the process of the invention may take a number of forms. In a first embodiment the composition may comprise fibrous material as a skin forming promoter component which bonds together the aqueous alkaline composition to form a peelable skin. Such compositions generally contain a gelling agent as a skin forming promoter component in addition to the fibre. In a modification of this embodiment the composition may contain a filler as an additional skin forming promoter component to thicken the composition and increase the absorptive properties of the peelable skin.

In an alternative embodiment, no fibrous material is employed, but the peelable property is achieved by thickening the composition with filler and employing a particular combination of gelling agents.

Thus in its broadest aspect the first embodiment of the invention mentioned above is a spreadable aqueous composition comprising an alkali and an appropriate amount of fibrous material, the composition being sufficiently alkaline to strip paint.

The alkali is most conveniently an alkali metal hydroxide, since these give a highly alkaline composition and are readily available and cheap; sodium and potassium hydroxide are preferred. However, it is possible to use other alkaline materials having a pH in aqueous solution greater than 10, such as alkali metal silicates— for example, sodium metasilicate—and phosphates—for example, trisodium phosphate. Other high alkaline materials, preferably with a pH greater than 12 and most preferably with a pH greater than 13, are well known in the art and could be used in the compositions of the invention. Sodium hydroxide is generally most preferred for use as the alkaline material, as other compounds are more expensive and milder or slower acting. If desired, sodium hydroxide may be provided by using a mixture of sodium carbonate and calcium hydroxide.

In some applications, such as where there may be a danger of staining the surface under the paint, it may be desirable to select a milder alkaline agent, and in that case trisodium phosphate might be used.

The concentration of alkaline material in the composition will be selected according to known criteria, and this selection is believed to be within the competence of one skilled in the art. When sodium hydroxide is used as the alkaline material, it would be possible to employ concentrations of 25% by weight or higher. However, it is preferred to use no more than 12% sodium hydroxide, since this avoids restrictions in use resulting from regulations for handling poisons. The lower concentration limit is determined by the paint stripping job for which the composition is intended, and could be as low as 1% or even lower. However, the usual concentration range for sodium hydroxide is from 3% to 12%, and most preferably from 3% to 7%. Within those preferred ranges the particular concentration is selected having regard to the speed of stripping that is required, set against the effect on the cost of the stripper.

When other alkaline materials are used the preferred concentration would be judged on a similar basis. Potassium hydroxide may be used at concentrations of up to 17% without requiring special treatment under poisons regulations, so this alkali might be preferred when a higher concentration is needed. A likely concentration range for the other alkaline materials mentioned hereinbefore is from 30% to 40%.

The compositions preferably contain a gelling agent, as an additional skin forming promoter component, and this may be a natural or synthetic, water-soluble polymer. Such gelling agents are well known to those skilled in the art. Examples of appropriate agents are polyacrylic acid and its lower-alkyl esters (where the lower-alkyl group contains from one to four carbon atoms), starch, natural gums such as gum tragacanth or British gum, cellulose ethers, hydroxyethyl cellulose, xanthan gums and synthetic clays such as montmorillonite clays. Preferred gelling agents are the xanthan gums and synthetic clays. An example of a commercially available xanthan gum is Kelzan, a high molecular weight natural polysaccharide produced in a pure culture fermentation process by the microorganism *Xanthomonas campestris*, and available from Kelco, a division of Merck and Co. Inc. A preferred synthetic clay is Laponite, which is a synthetic hectorite—a magnesium silicate containing lithium, and fluorine or hydroxide groups in a layered structure. This clay is available from Laporte Industries Limited.

The amount of gelling agent used is selected on the basis of the thickness required for the composition having regard to the properties of the particular gelling agent used. It is not possible to indicate preferred ranges for gelling agents in general, since different agents are used at different concentrations to achieve the same degree of gelling. However, it is believed to be within the competence of one skilled in the art to select an appropriate gelling agent concentration. By way of illustration only, it may be said that it is unlikely that the gelling agent will be used in concentrations in excess of 10% by weight, while a convenient lower limit is 0.1%. Examples are given hereinafter which further illustrate suitable concentrations of gelling agents in particular compositions.

The fibrous material in the first embodiment of the invention functions to hold together the gelled layer of composition on the painted surface and so make the layer peelable. A wide variety of organic and inorganic, natural and synthetic fibres may be used to contribute peelability to the composition, provided that the fibre is not degraded by the other components of the composition at the concentrations employed. The fibres may be, for example, ground paper, flaked paper, paper punchings, wool, textile fibres, asbestos, wood pulp, or plastics material fibre such as viscose fibre (for example rayon or cellophane fibres) or ground synthetic leather (for example polyvinyl or polyvinyl chloride fibres). These forms of fibre are relatively cheap since they are derived from waste materials, and ground paper in particular provides a cheap source of fibre and for that reason is preferred.

The fibre used is preferably in the form of relatively short individual fibres, by which it is meant that the fibres do not exceed 10 mm. in length. A preferred form of random ground paper fibre has fibres with lengths of up to 2 mm.

The fibre content of the composition is chosen to give the desired degree of peelability in conjunction with the selected gelling agent. Typically the fibre will constitute no more than 25% by weight of the composition, and in general compositions will contain no more than 15% fibre and preferably no more than 12% fibre. Too much fibre may lead to the composition being too thick for it to be applied conveniently to the surface being stripped. A preferred lower limit is about 5% fibre, while excellent peelability is achieved with fibre contents of not less than 8%.

The fibre-containing compositions of the invention may also contain a filler—that is to say, a solid, particulate component substantially inert to the other components of the composition and to paint, again as an additional skin forming promoter component. This filler acts to bulk out the composition and increase its thickness. In addition, when the composition is in use the filler absorbs the liquified paint which has been attacked by the alkali, and helps to prevent runs. Suitable fillers which may be used include powdered chalk, clay, fly ash, vermiculite and wood flour. Of these, powdered chalk is most preferred for use in the invention.

The filler should not be employed in a concentration at which the composition becomes too thick to be spreadable, and clearly the amount of filler which may be employed to give a spreadable composition is affected by the amount of fibre present. In general, when filler is present the amount of fibre may be reduced. It has been found desirable for up to 64% filler to be used in conjunction with up to 20% fibre, and effective compositions may be obtained with filler and fibre even when the amount of fibre is below 5%, which is the preferred lower limit for fibre content in the absence of filler. It has been found that the ratio of filler to fibre is most conveniently in the range of from 6:1 to 1:1, and most preferably in the region of 4:1.

It has also been found that peelable compositions may be obtained without the use of fibre, by using filler in conjunction with a specific combination of gelling agents. Thus in the alternative embodiment, this invention provides a spreadable composition comprising an alkali, filler, a xanthan gum and a synthetic hectorite clay, the composition being sufficiently alkaline to be capable of stripping paint.

The alkali used in this embodiment is selected according to the criteria set out hereinbefore and employed at the concentrations previously suggested.

The filler may be selected from those materials identified hereinbefore, but is generally used at somewhat higher concentrations. The filler will generally be present in an amount of at least 25% by weight, and preferably of up to 75% by weight. Most preferably the amount of filler lies in the range of from 50% to 70% in the fibre-free compositions. The actual amount of filler used is determined by the rheological properties of the compositions, which are in turn set by the nature and concentrations of the gelling agent. In qualitative terms, the amount of filler should not be so low as to result in a slurry which would tend to run off a surface being stripped. Neither should so much filler be present that the composition cannot readily be spread onto a surface.

In a preferred embodiment the composition is thixotropic, but naturally even when it exhibits this property it should become sufficiently mobile on being worked to permit spreading.

It has been found that a particular combination of gelling agents is required to obtain peelability in a composition containing filler and no fibre. The xanthan gum is preferably Kelzan gum, and the clay is preferably Laponite. These gelling agents are preferably used at concentrations of from 0.2% to 4% Kelzan and from 0.1% to 2.0% Laponite, the ratio of Kelzan to Laponite being in the range of from 5:1 to 1:1.

Both types of compositions of the invention, and thus whether or not containing fibre, may also include other standard ingredients for paint stripping compositions such as wetting agents, dyes, preservatives and water-miscible organic solvents. All such additives must of course be compatible with the other ingredients, and in particular they must be compatible with the alkalinity of the compositions, as well as being water-miscible. The selection of these conventional ingredients and suitable concentrations for them is believed to be within the competance of one skilled in the art.

In use the compositions of the invention are applied to a painted surface typically as a layer of up to 3–4 mm. thick. It is convenient to apply the composition to the surface with a trowel or similar spreader. The composition is then left until the paint has been softened; typically this will be a period of from one to six hours, although longer periods of contact may be desirable when many coats of paint are to be removed. If the layer of composition dries out during this time, it can be sprayed with water to dampen it and ensure maximum contact of the alkali with the paint.

The layer of composition is then removed as a peelable skin using a scraper or similar tool, although actual scraping of the underlying surface should not be necessary. The skin is lifted away from the surface together with the softened paint, and complex shapes can be readily stripped without having to scrape paint from every crevice.

In a second aspect, the invention thus includes a method of stripping a paint layer from an underlying surface, which method comprises applying to the paint layer an effective amount of a composition as described herein, allowing the composition to form a peelable skin in conjunction with paint softened by the action of the composition, lifting the formed skin and peeling it away from the underlying surface to strip the paint therefrom.

The compositions of the invention have been described above in their ready-to-use form. It is to be understood, however, that the compositions of the invention may be produced for distribution and sale in dry powder form. Accordingly, the present invention in another aspect provides a composition in dry powder form which, when mixed with water, can form a spreadable aqueous paint stripper composition as described herein.

The dry powder composition may be the same as the spreadable aqueous composition, except for the inclusion of water. However, since at least some of the alkali materials described above may not be conveniently handled in dry form, it is preferred to formulate the dry composition with a mixture of calcium hydroxide (lime) and an alkali metal salt, the anion of which forms an insoluble salt with calcium. The ingredients of such a mixture when mixed with water provide an alkali metal hydrodixe, e.g. sodium hydroxide, but when in dry form are more easily handled than the corresponding alkali metal hydroxide.

Preferably, the alkali metal salt and the calcium hydroxide are employed in substantially stoichiometric amounts, the percentage of each in the dry composition being such as to provide a corresponding percentage of alkali metal hydroxide in accordance with the above description, preferably 3 to 12% by weight of hydroxide.

Since the dry powder composition is especially useful as a do-it-yourself product, it may if necessary be formulated with an increased amount of filler (where present) to facilitate mixing with water. Thus, for example, where a filler and fibre together are employed the ratio of filler to fibre may be up to about 7:1.

Preferably the dry powder composition includes a mixture of lime and sodium carbonate to provide sodium hydroxide when mixed with water.

The following Examples are now given, though only by way of illustration, to show aspects of the invention in more detail.

EXAMPLE 1

Paint stripper containing fibre and filler

A composition was prepared from the following ingredients:

|  | Grams |
| --- | --- |
| Kelzan | 26.2 |
| Sodium hydroxide solution (46% w/w) | 104.6 |
| Ground paper | 104.6 |
| Chalk | 104.6 |
| Water | 660.0 |
|  | 1000.0 grams |

EXAMPLE 2

Paint stripper containing fibre

A composition was prepared from the following ingredients:

|  | Grams |
| --- | --- |
| Kelzan | 26.2 |
| Laponite S | 10.7 |
| Sodium hydroxide solution (46% w/w) | 104.6 |
| Ground paper | 104.6 |
| Water | 753.9 |
|  | 1000.0 grams |

EXAMPLE 3

Paint stripper containing filler

A composition was prepared from the following ingredients:

|  | Grams |
| --- | --- |
| Kelzan | 10.5 |
| Laponite S | 4.3 |
| Sodium hydroxide solution (46% w/w) | 83.3 |
| Chalk | 640.0 |
| Water | 261.9 |
|  | 1000.0 grams |

EXAMPLE 4

Paint stripper containing filler and fibre

A thixotropic composition was prepared from the following ingredients:

|  | kg. |
| --- | --- |
| Kelzan | 1.00 |
| Laponite S | 0.50 |
| Sodium hydroxide solution (46% w/w) | 10.45 |
| Chalk | 34.83 |
| 1/16" Ground paper | 7.46 |
| Water | 45.77 |
|  | 100.01 kg. |

EXAMPLE 5

Paint stripper containing filler and fibre

A composition was prepared from the following ingredients:

|  | kg. |
| --- | --- |
| Kelzan | 0.871 |
| Laponite S | 0.435 |
| Sodium hydroxide solution (46% w/w) | 10.45 |
| Chalk | 37.31 |
| 1/8" Flaked paper | 8.71 |
| Water | 42.226 |
|  | 100.00 kg. |

EXAMPLE 6

Paint stripper containing filler and fibre

A composition was prepared from the following ingredients:

|  | % w/w |
| --- | --- |
| Kelzan | 2.6 |
| Sodium hydroxide | 5.0 |
| 1/8" Ground paper | 10.5 |
| 300 Mesh wood flour | 10.5 |
| Water | 71.4 |

EXAMPLE 7

Paint stripper containing filler and fibre

A composition was prepared from the following ingredients:

|  | % w/w |
| --- | --- |
| Kelzan | 2.6 |
| Sodium hydroxide | 5.0 |
| 500 Mesh vermiculite | 10.5 |
| 1/8" Ground paper | 10.5 |
| Water | 71.4 |

EXAMPLE 8

Paint stripper containing filler and fibre

A composition was prepared from the following ingredients:

|  | % w/w |
| --- | --- |
| Kelzan | 2.0 |
| Laponite | 0.8 |
| Sodium hydroxide | 5.0 |
| Chalk | 21.0 |
| 500 Mesh vermiculite | 10.5 |
| 1/16" Ground paper | 5.0 |
| Water | 55.7 |

EXAMPLE 9

Paint stripper containing filler and fibre

A composition was prepared from the following ingredients:

|  | % w/w |
| --- | --- |
| Kelzan | 1.0 |
| Laponite | 0.5 |
| Potassium hydroxide | 5.0 |
| Chalk | 35.0 |
| 1/8" Flaked paper | 7.5 |
| Water | 51.0 |

EXAMPLE 10

Paint stripper containing filler and fibre

A composition was prepared from the following ingredients:

|  | % w/w |
| --- | --- |
| Kelzan | 2.6 |
| Sodium hydroxide | 5.0 |
| Chalk | 10.5 |
| Viscose fibres | 10.5 |
| Water | 71.4 |

EXAMPLE 11

Paint stripper containing fibre and filler

A composition was prepared from the following ingredients:

|  | % w/w |
| --- | --- |
| Water | 58.2 |
| Chalk | 15.7 |
| 1/4" Flaked paper | 15.7 |
| Sodium hydroxide (46% w/w) | 10.4 |
|  | 100.0 |

The pH of the compositions of Examples 1 to 11 fall within the range of from 13 to 14.

EXAMPLE 12

Paint stripper containing fibre and filler

A composition was prepared from the following ingredients:

|  | % w/w |
| --- | --- |
| Kelzan | 1.0 |
| Laponite S | 0.5 |
| Trisodium phosphate | 10.0 |
| Chalk | 34.8 |
| 1/16" Ground paper | 7.5 |
| Water | 46.2 |

The pH of this compositon was 11.8.

EXAMPLE 13

Paint stripper containing fibre and filler

A composition was prepared from the following ingredients:

|  | % w/w |
| --- | --- |
| Kelzan | 1.0 |
| Laponite S | 0.5 |
| Sodium metasilicate | 10.0 |
| Chalk | 34.8 |
| 1/8" Flaked paper | 7.5 |
| Water | 46.2 |

The pH of this composition was 12.7

EXAMPLE 14

Paint stripper containing fibre and filler in dry powder form

A dry powder composition was prepared from the following ingredients:

|  | Parts by weight |
| --- | --- |
| Sodium carbonate | 5.0 |
| Calcium hydroxide | 3.5 |
| Chalk | 34.0 |
| Granulated paper 1/8" (3.2 mm) | 5.0 |
| Kelzan | 0.75 |
| Laponite S | 0.38 |

The above composition was suitable for transport, storage and sale in dry powder form and, when mixed with water to 100 parts w/w, formed a spreadable aqueous paint stripper composition which in use formed a peelable skin and afforded 100% paint removal without scraping as did those compositions containing sodium hydroxide.

EXAMPLE 15

Paint strippers containing fiber and filler in dry powder form

The compositions described in Examples 12 and 13 were formulated without water in dry powder form. When required for use the compositions were mixed with water to 100% w/w and performed in the manner described above.

The following Test Results are now presented, again only by way of illustration, to show the results obtained when stripping paint with prior art composition and with the compositions of the invention.

TEST RESULTS

Method

Paint stripping compositions were tested for their efficacy in removing four layers of oil-based paint from a wood surface. The painted surface was divided into test areas approximately 6 inches (15 cm)×4 inches (10cm) using pieces of self-adhesive plastics tape. A paint stripper composition under test was applied to a test area using a trowel or spatula to a thickness of approximately 1/8 inch (3 mm) judged by eye. The compositon was left in contact with the test area for a period of time and then removed using a spatula. The nature of the composition at the time of removal, the ease of removal and the amount of paint stripped was assessed. The results are set out hereinafter.

Results

To provide a comparison, a prior art paint stripper was tested. The composition of this prior art stripper was:

|  | % (w/w) |
| --- | --- |
| Gelling agent (Viscalex HV30 - an acrylic copolymer emulsion available from Allied Colloids Ltd) | 3.0 |
| Sodium hydroxide | 4.0 |
| Chalk | 66.5 |
| Anti-foaming agent | 0.2 |
| Water | 26.2 |

In separate tests this prior art composition was left in contact with test areas for ⅔ hour and 2 hours. The results are given in Table 1 below.

TABLE 1

| Composition | Contact time (hours) | Nature at removal | Paint stripped |
| --- | --- | --- | --- |
| Prior art | ⅔ | Paste | 80% |
| Prior art | 2 | Paste | 100% |

In each case the paint stripper composition was removed as a paste; it showed no cohesion and was not peelable. As a result it was necessary to scrape the paste off the stripped surface, which was a messy and time-consuming operation. After ⅔ hour, 80% removal was achieved—that is to say, all four layers of paint were removed over 80% of the test area. After 2 hours, 100% removal was achieved, and all four layers of paint were stripped from the test area.

The results obtained in testing compositions of the invention are set out in Table 2 below, in which the compositions are identified by reference to the Example in which the formulation details are given.

TABLE 2

| Composition | Contact time (hours) | Nature at removal | Paint stripped |
| --- | --- | --- | --- |
| 1 | 1 | Peelable skin | 100% |
| 2 | 1 | " | 100% |
| 3 | 1 | " | 100% |
| 4 | 1 | " | 100% |
| 4 | ⅔ | " | 100% |
| 5 | 1 | " | 100% |
| 6 | 1 | " | 100% |
| 7 | 1 | " | 100% |
| 8 | 1 | " | 100% |
| 9 | 1 | " | 100% |
| 10 | 1 | " | 100% |
| 11 | 10 | Dry peelable skin | 100% |
| 12 | 5 | Peelable skin | * |
| 13 | 5 | Peelable skin | ** |

*One layer completely removed, a second layer removable with scraping
**Approximately 90% removal with screening In each case the composition tested formed a peelable skin which could be lifted away from the test area in one piece together with the paint softened by the alkali. With the compositions containing sodium hydroxide or potassium hydroxide, 100% removal was obtained without scraping; it was simply necessary to wash down the stripped area after removing the skin to leave a clean stripped wood surface. The compositions containing trisodium phosphate and sodium metasilicate are intended to be milder so that they may be used on delicate workpieces or where selective removal of only top layers of paint is required. Thus in the test, complete removal of all four layers of paint was not achieved with these alkaline materials, but the compositions displayed the advantage of the invention in that they formed a peelable skin facilitating the stripping operation.

We claim:

1. An aqueous paint stripper composition intended to provide a peelable skin over a painted surface consisting essentially of (A) an alkaline material and (B) a combination of xanthan gum and hectorite clay in water.

2. A composition according to claim 1 wherein the alkaline material is selected from the group consisting of sodium hydroxide, potassium hydroxide, sodium metasilicate and trisodium phosphate.

3. A composition according to claim 2 which includes a filler selected from the group consisting of chalk, clay, fly ash, vermiculite and wood flour.

4. A composition according to claim 3 wherein the alkaline material is sodium hydroxide or potassium hydroxide.

5. A composition according to claim 4 which includes a wetting agent, a dye, preservatives or a water-miscible organic solvent.

6. A composition according to claim 4 wherein the filler is chalk.

7. A composition according to claim 6 containing from 1 to 25% sodium hydroxide; from 25 to 75% of filler; and wherein the gum to clay ratio is from 5:1 to 1:1.

8. A composition according to claim 7 containing from 3 to 12% sodium hydroxide and from 50 to 70% filler.

9. A composition according to claim 8 containing from 3 to 7% sodium hydroxide.

10. An aqueous paint stripper composition intended to provide a peelable skin over a painted surface consisting of: (A) an alkaline material, (B) a fibrous material selected from the group consisting of ground paper, flaked paper, paper punchings, wool, textile fibers, asbestos, wood pulp, viscose fiber and ground synthetic leather, and (C) a filler selected from the group consisting of chalk, clay, fly ash, vermiculite and wood flour in water.

11. A composition according to claim 10 wherein the alkaline material is selected from the group consisting of sodium hydroxide, potassium hydroxide, sodium metasilicate and trisodium phosphate.

12. A composition according to claim 11 which includes a gelling agent selected from the group consisting of polyacrylic acid, lower-alkyl polyacrylates, starch, natural gums, cellulose ethers, hydroxyethyl cellulose, xanthan gums and montmorillonite clays.

13. A composition according to claim 12 wherein the alkaline material is sodium hydroxide or potassium hydroxide.

14. A composition according to claim 11 wherein the alkaline material is sodium hydroxide or potassium hydroxide.

15. A composition according to claim 13 which includes a wetting agent, a dye, preservatives or a water-miscible organic solvent.

16. A composition according to claim 14 which includes a wetting agent, a dye, perservatives or a water-miscible organic solvent.

17. A composition according to claim 13 wherein the fibrous material is ground paper and the filler is chalk.

18. A composition according to claim 14 wherein the fibrous material is ground paper and the filler is chalk.

19. A composition according to claim 17 containing from 1 to 25% sodium hydroxide; from 0.1 to 10% of a gelling agent; from 5 to 25% of said fibrous material; and wherein the filler to fibre ratio is 6:1 to 1:1.

20. A composition according to claim 18 containing from 1 to 25% sodium hydroxide; from 5 to 25% of said fibrous material; and wherein the filler to fibre ratio is from 6:1 to 1:1.

21. A composition according to claim 19 containing from 3 to 12% sodium hydroxide; from 5 to 15% of said fibrous material; and wherein the filler to fibre ratio is 4:1.

22. A composition according to claim 20 containing from 3 to 12% sodium hydroxide; from 5 to 15% of said fibrous material; and wherein the filler to fibre ratio is 4:1.

23. A composition according to claim 21 containing from 3 to 7% sodium hydroxide and from 5 to 8% of said fibrous material.

24. A composition according to claim 22 containing from 3 to 7% sodium hydroxide and from 5 to 8% of said fibrous material.

* * * * *